United States Patent
Furuskär et al.

(10) Patent No.: US 8,594,581 B2
(45) Date of Patent: Nov. 26, 2013

(54) WIRELESS STATION AND METHOD IN A WIRELESS STATION FOR INITIATING RESOURCE MEASUREMENTS

(75) Inventors: Anders Furuskär, Stockholm (SE); Arne Simonsson, Gammelstad (SE); Jonas Pettersson, Luleå (SE); Per Magnusson, Linköping (SE); Stefan Rommer, Västra Frölunda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1083 days.

(21) Appl. No.: 12/095,935

(22) PCT Filed: Dec. 5, 2005

(86) PCT No.: PCT/SE2005/001831
§ 371 (c)(1),
(2), (4) Date: Aug. 12, 2008

(87) PCT Pub. No.: WO2007/067099
PCT Pub. Date: Jun. 14, 2007

(65) Prior Publication Data
US 2008/0305744 A1    Dec. 11, 2008

(51) Int. Cl.
*H04B 17/00* (2006.01)
(52) U.S. Cl.
USPC .... 455/67.11; 455/403; 455/41.2; 455/414.1; 455/445; 370/338; 370/331; 370/329; 370/318; 370/311

(58) Field of Classification Search
USPC .......... 455/67.11, 450, 41.2, 445, 414.1; 370/312, 338, 252, 111, 329
See application file for complete search history.

(56) References Cited

U.S. PATENT DOCUMENTS

| | | | |
|---|---|---|---|
| 7,221,927 B2 * | 5/2007 | Kolar et al. | 455/403 |
| 7,450,552 B2 * | 11/2008 | Behroozi | 370/338 |
| 7,519,033 B2 * | 4/2009 | Soomro | 370/338 |
| 7,706,326 B2 * | 4/2010 | Marinier et al. | 370/331 |
| 7,742,443 B2 * | 6/2010 | Wentink | 370/318 |
| 7,869,809 B2 * | 1/2011 | Qi et al. | 455/445 |
| 2003/0161341 A1 | 8/2003 | Wu et al. | |
| 2004/0037257 A1 * | 2/2004 | Ngo | 370/338 |
| 2005/0122927 A1 * | 6/2005 | Wentink | 370/311 |
| 2005/0130634 A1 * | 6/2005 | Godfrey | 455/414.1 |
| 2005/0135304 A1 * | 6/2005 | Wentink et al. | 370/329 |
| 2005/0135305 A1 * | 6/2005 | Wentink | 370/329 |
| 2005/0250495 A1 | 11/2005 | Black et al. | |
| 2006/0258286 A1 * | 11/2006 | Qi et al. | 455/41.2 |
| 2007/0002757 A1 * | 1/2007 | Soomro et al. | 370/252 |
| 2007/0002806 A1 * | 1/2007 | Soomro | 370/338 |

FOREIGN PATENT DOCUMENTS

WO    WO 2004100450 A1    11/2004

* cited by examiner

*Primary Examiner* — April G Gonzales

(57) ABSTRACT

The present invention relates to a method and a wireless station for initiating radio resource measurements. A wireless station identifies a need for radio resource measurements by a second wireless station despite there is no association between the wireless station and the second wireless station allowing direct radio communication between said stations. The wireless station initiates a request for radio resource measurements by the second wireless station.

12 Claims, 3 Drawing Sheets

WIRELESS STATION AND METHOD IN A WIRELESS STATION FOR INITIATING RESOURCE MEASUREMENTS

TECHNICAL FIELD OF THE INVENTION

The invention relates to a wireless station and a method in a wireless station. More in particular the invention relates to radio resource measurements.

DESCRIPTION OF RELATED ART

Radio resource measurements, i.e. measurements performed by analyzing received radio signals (e.g. signal quality) and/or collecting traffic statistics (e.g. channel utilization), are used in radio communication systems as input for e.g. radio resource management decisions.

The IEEE 802.11k revision of the IEEE 802.11 specifications provides mechanisms for radio resource measurements in IEEE 802.11 Wireless Local Area Networks (WLANs) enabling wireless stations of a WLAN to automatically adjust to the radio environment in which they exist. A wireless station can make measurements locally as well as request measurements from other wireless stations with whom the wireless station has an association allowing direct radio communication. In infrastructure mode, an access point (AP) can request radio resource measurements from another wireless station (e.g. a portable or mobile station) within the same Basic Service Set (BSS) and vice versa. In adhoc mode, wireless stations can request radio resource measurements of other wireless stations within the same Independent Basic Service Set (IBSS).

In Universal Mobile Telecommunication Systems (UMTS) specified by the 3rd Generation Partnership Project (3GPP), a Serving Radio Network Controller (SRNC) may order a mobile station, alternatively referred to as User Equipment (UE), currently associated with the Serving Radio Network Controller to perform radio resource measurements. A Radio Network Controller (RNC) may also request its associated radio base stations to perform radio resource measurements.

SUMMARY OF THE INVENTION

The problem addressed by the present invention is providing improved knowledge of conditions for communication involving the wireless station (e.g. the radio environment of the wireless station).

One advantage afforded by the invention is improved knowledge of conditions for communication involving the wireless station. This information may be used to e.g. optimize radio resource usage in the vicinity of the wireless station and/or provide improved performance of radio communications involving the wireless station.

The invention will now be described in more detail with reference to exemplary embodiments thereof and also with reference to the accompanying drawings.

DETAILED DESCRIPTION OF THE EMBODIMENTS

Figure 1:
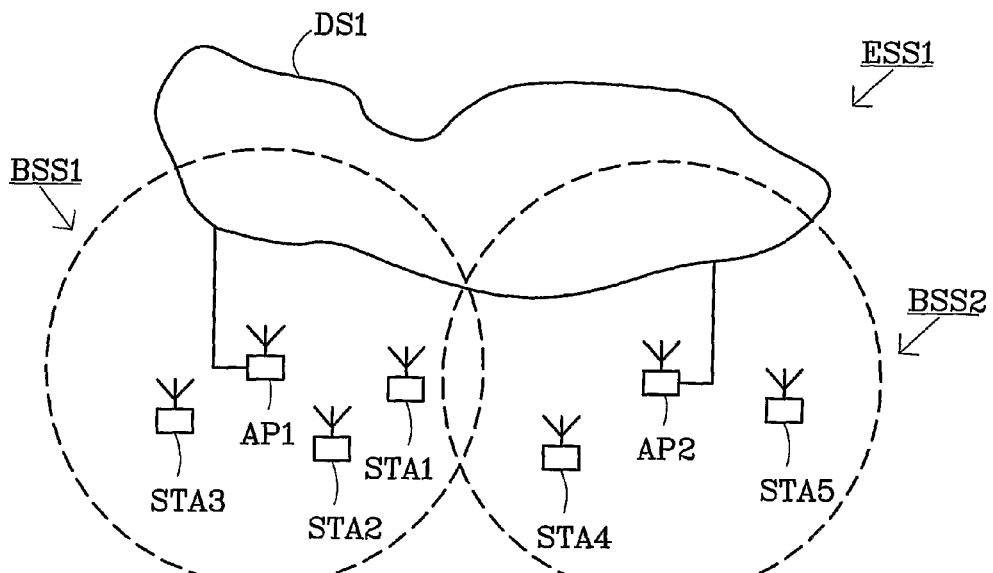
FIG. 1 is a schematic view of an example radio communication system in which the present invention may be advantageously employed.

FIG. 1 illustrates a non-limiting example of a radio communication system in which the present invention may be employed. The exemplary radio communication system illustrated in FIG. 1 is a IEEE 802.11 Wireless Local Area Network (WLAN). The WLAN shown in FIG. 1 operates in so called infrastructure mode and thus illustrates an Extended Service Set ESS1 comprising a first Basic Service Sets BSS1 and a second Basic Service Set BSS2 interconnected via a Distribution System DS1. The first Basic Service Set BSS1 comprises a first Access Point AP1 and three other wireless stations (e.g. portable or mobile wireless stations) STA1-STA3 while the second Basic Service Set BSS2 comprises a second Access Point AP2 and two other wireless stations (e.g. portable or mobile wireless stations) STA4-STA5.

In this exemplary scenario, both access points AP1 and AP2 as well as all other wireless stations STA1-STA3 support the IEEE 802.11k revision of the IEEE 802.11k specifications. The IEEE 802.11k revision provides mechanisms for radio resource measurements in IEEE 802.11 Wireless Local Area Networks enabling wireless stations of a WLAN to automatically adjust to the radio environment in which they exist. A wireless station can make measurements locally as well as request measurements from other wireless stations with whom the wireless station has an association allowing direct radio communication. Thus, in the example scenario of FIG. 1, the first Access Point AP1 can request radio resource measurements by the other wireless stations STA1-STA3 of the first Basic Service Set BSS1 and vice versa while the second Access Point AP2 can request radio resource measurements by the other wireless stations STA4-STA5 of the second Basic Service Set BSS2 and vice versa.

The radio resource measurements defined in IEEE 802.11k draft version 3.0 includes measurements providing e.g. the following measurement reports:

Basic Report providing misc information relating to a measured channel such as whether radar, MAC Protocol Data Units, OFDM preambles or other significant power are detected on the channel.

Clear Channel Assessment Report indicating the fraction of time a measured channel was found busy during a measurement period.

Receive Power Indication Report indicating received power levels on a measured channel.

Channel Load Report providing the proportion of time for which the measuring wireless station determined the channel to be busy, i.e. the time which physical carrier sense or the Network Allocation Vector (NAV) indicated busy.

Noise Histogram Report including non-802.11 energy for the requested channel by sampling the channel when CCA (Clear Channel Assessment) indicates idle. The report includes the RPI (Received Power Indicator) densities observed in the channel for eight specified RPI levels.

Beacon Report providing RCPI (Received Channel Power), BSSID (Basic Service Set identification), beacon interval and additional parameters which are based on detected beacon or probe responses. Reporting conditions determines how the measurement shall be aggregated and conditions when a beacon report shall be sent to the requesting wireless station.

Frame Report providing a summary of traffic from one transmit address and contains number of frames, RCPI and BSSID and transmit address.

STA statistics Report indicating the change in STA counters (in the MIB.dot11 counters table) within a specified measurement duration.

Link Measurement Report includes link path loss and estimation of link margin.

The inventors of the present invention have recognized that it would be desirable for a wireless station to be able to request radio resource measurements not only from other wireless stations with which the wireless station is associated in a way allowing direct radio communication, but also from other wireless stations with which the wireless station does not have an association allowing direct radio communication.

Figure 2:
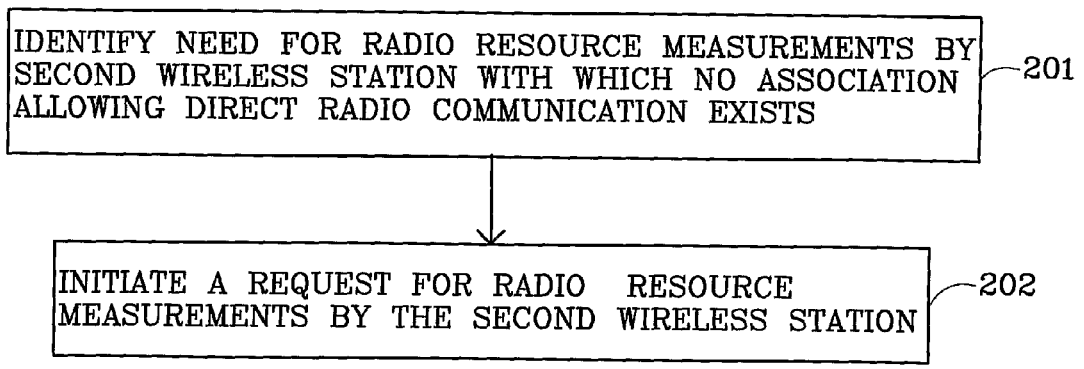
FIG. 2 is a flowchart illustrating a basic method according to the invention.

FIG. 2 is a flow chart illustrating a basic method according to the invention.

At step 201, a wireless station identifies a need for radio resource measurements by a second wireless station despite there is no association between the wireless station and the second wireless station allowing direct radio communication between said stations.

At step 202, the wireless station initiates a request for radio resource measurements by the second wireless station.

Since no association allowing direct radio communication between the wireless station and the second wireless stations exists, identifying a need for measurements by the second wireless station can not be based on the first wireless station regarding the second wireless station as a current peer party for peer-to-peer direct radio communication. Instead identifying the need for radio resource measurements by the second wireless station may e.g. be based on identifying the second wireless station from the results of radio resource measurements performed by the wireless station itself or performed and reported to the wireless station by a third wireless. In other embodiments of the invention, identifying a need for radio resource measurements by the second wireless station may e.g. be based on recognizing the second wireless station as a wireless station with which the wireless station has previously been involved in direct radio communication.

In many embodiments of the invention, the request for radio resource measurements is transmitted by the first wireless station to the second wireless station via at least one intermediate wireless station. In these embodiments, preferably the request for radio resource measurements would be transparent to the at least one intermediate wireless station, i.e. the at least one intermediate wireless station would not be aware that it has communicated a request for radio resource measurements to the second wireless station.

In different embodiments of the invention the wireless station may be e.g. a portable or mobile station but it may also be a wireless station acting as an access point. Similarly the second wireless station may be e.g. a portable or mobile station but it may also be a wireless station acting as an access point.

Figure 3:
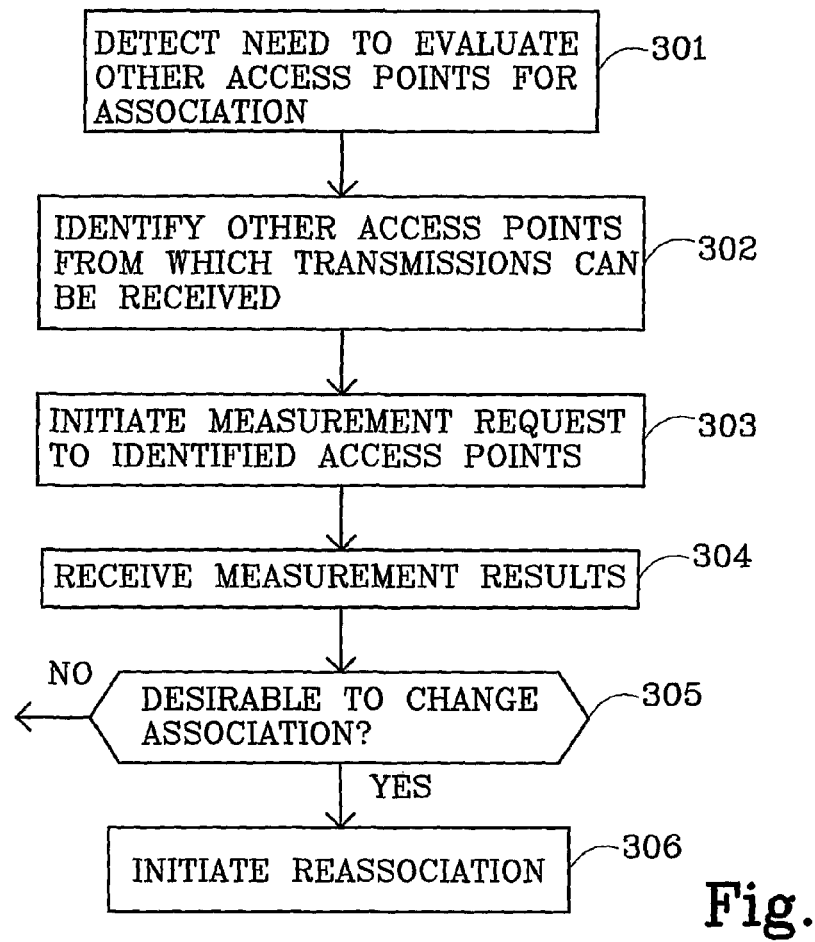
FIG. 3 is a flow chart illustrating more in detail an exemplary first embodiment of a method according to the invention.

FIG. 3 is a flow chart illustrating more in detail a first exemplary embodiment of a method according to the invention. This first exemplary embodiment is illustrated using an example scenario in which a first wireless station, e.g. STA1 in FIG. 1, currently associated with the first access point AP1 in FIG. 1 evaluates whether it instead should associate with another access point e.g. the second access point AP2 in FIG. 1.

At step 301, the first wireless station STA1 detects a need to evaluate other access points for association. This could be triggered by e.g. the signal quality from the first access point AP1, i.e. the access point with which the first wireless station STA1 currently is associated, decreasing under a certain threshold, and/or the traffic load in the first access point AP1 exceeding a certain threshold.

At step 302, the first wireless station STA1 identifies other access points, i.e. access points with which the first wireless station currently is not associated, which it can receive transmissions from in its current location. The first wireless station STA1 may use active or passive scanning when performing step 302. The wireless station may scan all IEEE 802.11 channels or only those channels listed in an AP Channel Report received from the first access point AP1. In this example scenario, the first wireless station STA1 thus identifies the second access point AP2 at step 302.

At step 303, the first wireless station STA1 initiates radio resource measurement requests to all access points identified at step 302. The requested measurements could be e.g. the Basic Report, or the Channel Load Report. Ordinary, IEEE 802.11k measurement requests are transmitted in IEEE 802.11 management frames. However, since the radio resource measurement requests must be transmitted to the identified access points via the first access point AP1, ordinary IEEE 802.11 management frames can not be used to convey the radio resource measurement requests. Instead the measurement requests (i.e. the Frame Body part of the corresponding IEEE 802.11k radio resource measurement request management frame) are included in data frames for which a new Data Frame Subtype e.g. "management frame" is assigned. This enables the measurement requests to be transmitted from the first wireless station STA1 to the identified access points via the first access point AP1 using the "3 address"-format of IEEE 802.11 data frames. In the present example scenario, the first wireless station STA1 would thus transmit a radio resource measurement request to the second access point AP2 via the first access point AP1.

At step 304, the first wireless station STA1 receives measurement results in response to the measurement requests initiated at step 303. Thus, in the present example scenario, the first wireless station STA1 receives measurement results from the second access point AP2 via the first access point AP1. The measurement results may be conveyed in a similar way as the measurement request, i.e. using a data frame with a new Data Frame subtype e.g. "management frame" and the "3 address"-format of IEEE 802.11 data frames.

At step 305, the first wireless station STA1 decides whether it would be desirable to change association. Thus, in this example scenario, the first wireless station STA1 compares the radio, traffic, and capability characteristics of the first access point AP1 and the second access point AP2. For instance, based on estimated signal-to-noise ratios $SNR_1$ and $SNR_2$, reported traffic loads $rho_1$ and $rho_2$, and maximum supported rates $R_{max1}$ and $R_{max2}$, for the first access point AP1 and the second access point AP2 respectively, an efficient rate $R_{eff}$ can be calculated as $$R_{eff\,AP} = \max\{BW*\log 2(1+SNR_{AP}/k), R_{maxAP}\}*(1-rho_{AP}), \text{ for AP}=1, 2$$

where BW is the system bandwidth (about 20 MHz for 802.11), and k is an implementation margin constant. Setting k=1 yields the well-known Shannon channel capacity formula, which is an upper bound. Consequently, k reflects how much larger SNR is needed to reach a certain bitrate in a real system as compared to in an ideal system. Typical values for k are 2-4 times, or 3-6 dB.

$R_{eff1}$ associated with the first access point AP1 is compared to $R_{eff2}$ associated with the second access point AP2. If $R_{eff2} <= R_{eff1}$ the first wireless station STA1 should stay associated with the first access point AP1 (an alternative NO at step 305). If $R_{eff2} > R_{eff1}$ it would be desirable for the first wireless station STA1 to change its association from the first access point AP1 to the second access point AP2 (an alternative YES at step 305) and the first wireless station STA1 accordingly initiates a change of its association from the first access point AP1 to the second access point AP2 at step 306 in accordance with the IEEE 802.11 reassociation procedure.

In scenarios where several other access points are identified at step 302, the efficient rate $R_{eff}$ of all identified other access points would typically be calculated and considered when deciding at step 305 whether it would be desirable to change association and, if change of association is found desirable, to which access point.

Figure 4A:
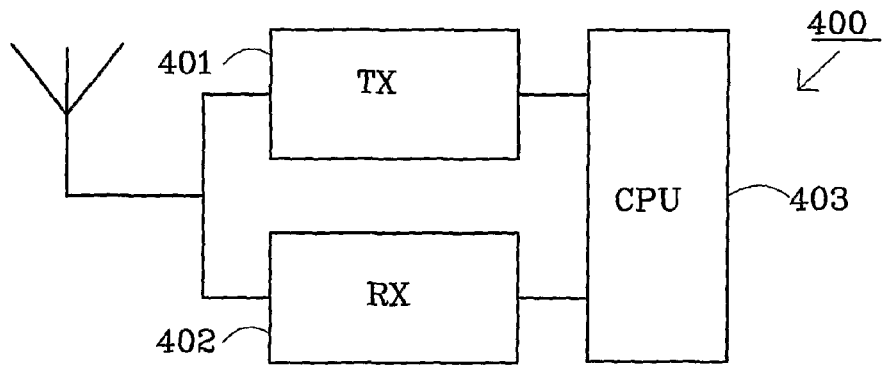
FIG. 4A is a block diagram schematically illustrating an exemplary first embodiment of a wireless station according to the invention.

FIG. 4A is a block diagram schematically illustrating a first exemplary embodiment of a wireless station 400 according to the invention for implementing the method illustrated in FIG. 3.

Figure 4B:
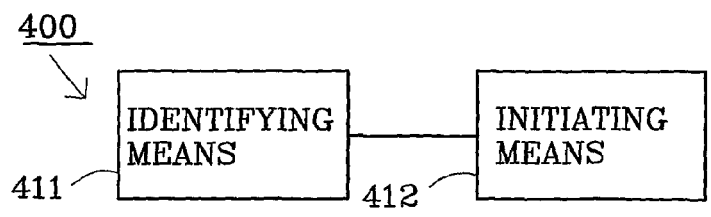
FIG. 4B is a block diagram illustrating functional units of the wireless station in FIG. 4A.

The wireless station 400 includes a transmitter 401 and a receiver 402, both operable connected to digital data processing circuitry in the form of a programmable processor 403. The transmitter 401 is adapted to transmit signals according to the IEEE 802.11 specifications including radio resource measurement requests/results and other MAC Protocol Data Units while the receiver 402 is adapted to receive said signals. The processor 403 controls and coordinates the operations of the transmitter 401 and the receiver 402. The receiver 402 is further adapted to perform different radio resource measurements by receiving radio signals and, in interaction with the processor 403, analyzing the received radio signals. The processor is in particular programmed to function as identifying means for identifying a need for radio resource measurements by a second wireless station with which no association allowing direct radio communication exists (by performing the processing of steps 301-302 in FIG. 3) and as initiating means for initiating a request for radio resource measurements by said second wireless station (step 303 in FIG. 3) in response to identifying said need for radio resource measurements. FIG. 4B schematically illustrates a logical block diagram of the wireless station 400 illustrating said identifying means 411 operable connected to said initiating means 412.

Apart from the exemplary first embodiments of the invention disclosed above, there are several ways of providing rearrangements, modifications and substitutions of the disclosed embodiments resulting in additional embodiments of the invention.

Figure 5:
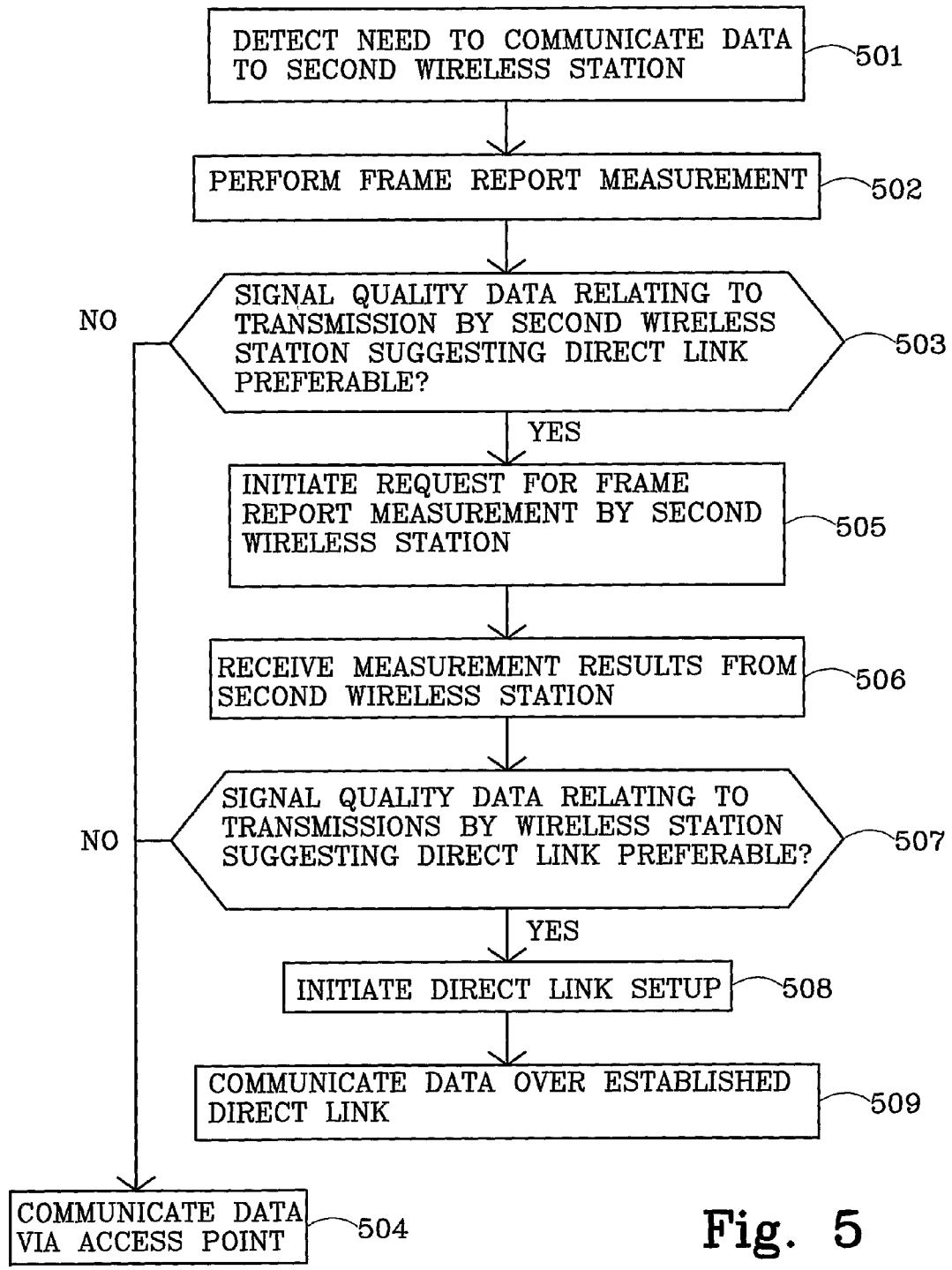
FIG. 5 is a flow chart illustrating more in detail an exemplary second embodiment of a method according to the invention.

There are several different situations in which different embodiments of the invention may be applied in order to gather information providing improved knowledge of conditions for communication involving the wireless station (e.g. the radio environment of the wireless station) which may be used to e.g. optimize radio resource usage in the vicinity of the wireless station and/or provide improved performance of radio communications involving the wireless station. As an example, FIG. 5 is a flow chart illustrating more in detail a second exemplary embodiment of a method according to the invention. This second exemplary embodiment is illustrated using an example scenario in which a first wireless station, e.g. STA1, attempts to establish a direct radio communication with a second wireless station, e.g. STA2 in the first Basic Service Set BSS1 of FIG. 1 using the Direct Link Setup (DLS) mechanism specified in the IEEE 802.11e revision of the IEEE 802.11 specifications.

At step 501, the first wireless station STA1 detects a need to communicate data to the second wireless station STA2. Before communicating the data, the first wireless station STA1 determines whether it would be desirable to communicate the data using the IEEE 802.11e Direct Link Setup mechanism. Using direct link communication between the wireless stations STA1 and STA2 may be desirable e.g. when direct link communication is believed to be more efficient (requiring less power, providing higher bit rate etc) than communication via the first access point AP1. A decision to investigate whether direct link communication is preferable may e.g. be triggered when encountering communication performance between the first wireless station STA1 and the first access point AP1 which is worse than a predefined threshold (e.g in terms of power, sustainable bit rate etc).

At step 502 the first wireless station STA1 performs a frame report radio resource measurement.

At step 503, the first wireless station STA1 analyzes the results of the frame report measurement.

If the measurement results include no signal quality data relating to transmissions by the second wireless station STA2 or said signal quality data suggest that direct communication between the first and the second wireless stations would not be preferable to communication via the first access point AP1 (an alternative NO at step 503), the first wireless station STA1 communicates the data to the second wireless station STA2 via the first access point AP1 at step 504.

If the measurement results include signal quality data relating to transmissions by the second wireless station STA2 and said signal quality data suggests that direct radio communication between the first and the second wireless stations would be preferable, i.e. estimated as providing better performance (e.g. requiring less transmit power, providing higher bit rate etc), to communication via the first access point AP1 (an alternative YES at step 503), the first wireless station STA1 initiates a request for a frame report radio resource measurement by the second wireless station STA2 at step 505. Thus, the first wireless station STA1 prepares a request for a frame report radio resource measurement by the second wireless station STA2. In a similar way as in the first exemplary embodiment, the measurement request (i.e. the Frame Body part of the corresponding IEEE 802.11k radio resource measurement request management frame) is included in a data frame for which a new Data Frame Subtype e.g. "management frame" is assigned and the measurement request is transmitted to the second wireless station STA2 using the "3 address"-format of IEEE 802.11 data frames.

At step 506, measurement results are received from the second wireless station STA2 via the first access point AP1. The measurement results may be conveyed in a similar way as the measurement request, i.e. using a data frame with a new Data Frame subtype e.g. "management frame" and the "3 address"-format of IEEE 802.11 data frames.

At step 507, the first wireless station STA1 analyzes the received measurement results.

If the measurement results includes no signal quality data relating to transmissions by the first wireless station STA1 or said signal quality data suggest that direct communication between the first and the second wireless stations would not be preferable to communication via the first access point AP1 (an alternative NO at step 507), the first wireless station STA1 communicates the data to the second wireless station STA2 via the first access point AP1 at step 504.

If the signal quality data relating to transmissions by the first wireless station STA1 suggest that direct radio communication between the first and the second wireless stations would be preferable (an alternative YES at step 507), the first wireless station STA1 initiates establishment of direct radio communication with the second wireless station STA2 at step 508 in accordance with the IEEE 802.11e Direct Link Setup mechanism.

At step 509 the first wireless station STA1 communicates the actual data to the second wireless station STA2 over the established direct radio communication link.

As an alternative to attempt initiating of a direct link to the second wireless station STA2 when the first wireless station STA1 has data which it needs to communicate to the second wireless station STA2, an attempt to initiate a direct link may be triggered by a predicted future need for communication of data between (to and/or from) the first wireless station STA1 and the second wireless station STA2. Such a predicted future need may exist e.g. for the interconnection of a set-top box and one or more television sets/Displays. Thus, according to this alternative, steps 502-508 could be triggered by the predicted future communication need.

There are several alternatives for how measurement requests/reports could be communicated between a wireless station requesting a radio resource measurement and a wireless station serving said request via one or more intermediated wireless stations. Instead of assigning an 802.11 Data frame subtype for management frames, an escape subtype with another field defining the content type could be used. Another alternative would be to encapsulate an IEEE 802.11k measurement request/report in an IEEE 802.11 data frame and assign a special Ethertype enabling the intended recipient of the measurement request/report to discriminate between measurement requests/reports and ordinary data frames. Yet another alternative would be to first establish a tunnel between the wireless station requesting a radio resource measurement request and the wireless station serving said request via one or more intermediate wireless stations and then transmitting the measurement request/report via said tunnel.

In the first exemplary embodiment of a wireless station according to the invention disclosed above, said identifying means 411 and initiating means 412 are implemented by digital data processing circuitry in the form of a conventional programmable processor. However in other embodiments, said means 411-412 could be implemented by any digital data processing circuitry (e.g. an ASIC, a discrete logic circuit etc) capable of performing the processing associated with said means 411-412. Programmable devices performing processing according to the invention can be dedicated to this task or used also for processing related to other tasks.

Even though the invention in its first exemplary embodiment has been applied in connection with an IEEE 802.11 wireless station, the invention may of course be applied also in other types of wireless stations supporting communication according to other types of protocols.

The invention claimed is:

1. A method in a wireless station for initiating radio resource measurements, said method comprising the steps of:
   identifying a need for radio resource measurements by a second wireless station;
   initiating a request for radio resource measurements by the second wireless station,
   wherein there is no association between the wireless station and the second wireless station allowing direct radio communication between said stations; and
   wherein said identifying step includes a substep of identifying said second wireless station from the results of a previous radio resource measurement performed by the wireless station itself or performed and reported to the wireless station by a third wireless station.

2. The method according to claim 1, wherein said wireless station transmits the request for radio resource measurements to the second wireless station via at least one intermediate wireless station.

3. The method according to claim 2, wherein said request for radio resource measurements is transparent to said at least one intermediate wireless station.

4. The method according to claim 3, wherein said request for radio resource measurements is encapsulated in a data frame addressed to said second wireless station.

5. The method according to claim 3, wherein said initiating step includes a substep of initiating a tunnel from said wireless station to said second wireless station via said at least one intermediate wireless station and wherein said request for radio resource measurements is transmitted from said wireless station to said second wireless station via said tunnel.

6. The method according to claim 1, wherein said radio resource measurements by the second wireless station involves at least one of analyzing received radio signals and collecting traffic statistics.

7. A wireless station for use in a radio communication system, said wireless station comprising:
   a processor adapted to identify a need for radio resource measurements by a second wireless station;
   the processor further adapted to initiate a request for radio resource measurements by the second wireless station,
   wherein there is no association between the wireless station and the second wireless station allowing direct radio communication between said stations; and
   wherein said processor is further adapted to identify said second wireless station from the results of a previous radio resource measurement performed by the wireless station itself or performed and reported to the wireless station by a third wireless station.

8. The wireless station according to claim 7, wherein said processor is adapted to initiate transmission of the request for radio resource measurements to said second wireless station via at least one intermediate wireless station.

9. The wireless station according to claim 8, wherein said request for radio resource measurements is transparent to said at least one intermediate wireless station.

10. The wireless station according to claim 9, wherein said request for radio resource measurements is encapsulated in a data frame addressed to said second wireless station.

11. The wireless station according to claim 9, wherein said processor is adapted to initiate a tunnel from said wireless station to said second wireless station via said at least one intermediate wireless station and wherein said request for radio resource measurements is transmitted from said wireless station to said second station via said tunnel.

12. The wireless station according to claim 7, wherein said radio communication system is a Wireless Local Area Network.

* * * * *